(12) United States Patent
Venkatappa et al.

(10) Patent No.: US 7,520,804 B2
(45) Date of Patent: Apr. 21, 2009

(54) CLIMATE CONTROL SYSTEM HAVING NOISE REDUCTION DOOR

(75) Inventors: Suhas Venkatappa, Ann Arbor, MI (US); Prakash Thawani, Bloomfield Hills, MI (US)

(73) Assignee: Ford Motor Company, Dearborn, MI (US)

( * ) Notice: Subject to any disclaimer, the term of this patent is extended or adjusted under 35 U.S.C. 154(b) by 26 days.

(21) Appl. No.: 11/290,665

(22) Filed: Nov. 30, 2005

(65) Prior Publication Data

US 2007/0123159 A1    May 31, 2007

(51) Int. Cl.
*F24F 7/00* (2006.01)
(52) U.S. Cl. .................... 454/139; 454/143; 454/145
(58) Field of Classification Search ............... 454/121, 454/139, 156
See application file for complete search history.

(56) References Cited

U.S. PATENT DOCUMENTS

| 5,653,630 | A | * | 8/1997 | Higashihara | 454/121 |
| 5,699,851 | A | * | 12/1997 | Saida et al. | 165/42 |
| 5,899,262 | A | * | 5/1999 | Yamaguchi et al. | 165/42 |
| 6,428,409 | B1 | * | 8/2002 | Egami et al. | 454/139 |
| 6,588,495 | B2 | * | 7/2003 | Ito et al. | 165/41 |

* cited by examiner

*Primary Examiner*—Steven B McAllister
*Assistant Examiner*—Samantha A Miller
(74) *Attorney, Agent, or Firm*—Tung & Associates; Raymond L. Coppiellie

(57) ABSTRACT

A HVAC system for reducing the level of air rush and blower noise escaping into the interior of the vehicle when the HVAC system is operating in the recirculation mode. The HVAC system includes a recirculation door having an acoustically transparent portion that enables a component of the air rush and blower noise to pass through the recirculation door to the vehicle exterior instead of entering the vehicle cabin or interior through the recirculation air inlet.

20 Claims, 3 Drawing Sheets

CLIMATE CONTROL SYSTEM HAVING NOISE REDUCTION DOOR

CROSS-REFERENCE TO RELATED APPLICATIONS

Not Applicable

BACKGROUND OF THE INVENTION

1. Field of the Invention

The present invention relates to a motor vehicle climate control system; and, more specifically to an apparatus that reduces air rush noise transmitted into the vehicle cabin or passenger compartment during operation of the system.

2. Description of Related Art

A motor vehicle climate control system or heating, ventilation air-conditioning (HVAC) system typically utilizes a blower to move and control airflow through the system. Air rush noise occurring in the HVAC system, especially when the blower is operated at high speeds; i.e., producing maximum airflow, is a customer comfort concern. In most vehicles, the operating mode generating the highest noise level is the recirculation mode with a high blower setting. The recirculation mode of the HVAC system draws air from the interior of the vehicle cabin or passenger compartment.

To operate the HVAC system in the recirculation mode, a recirculation door closes the fresh air inlet and opens the recirculation inlet enabling the HVAC system to draw air from the vehicle interior. Drawing air from the interior of the cabin not only provides a direct path for the inlet related noise but also traps other blower noises within the vehicle interior. Current recirculation doors used in climate control systems are a solid barrier of very stiff plastic or ABS material having a very low noise transmission loss. As a result, when the system is operating in the recirculation mode, it is almost 2-4 decibels louder than when operating in the fresh air mode.

One reason for the increased noise level is that when the recirculation door covers the fresh air inlet it prevents air rush and blower generated noise from escaping through the fresh air inlet to the exterior of the vehicle. Accordingly, closing the fresh air inlet audibly increases the noise level a perceptible amount as compared to operating the HVAC system in a fresh air mode, that is, when the recirculation door closes the recirculation air inlet and the fresh air inlet is open providing a path for noise to escape to the exterior of the vehicle.

It would be desirable to provide a recirculation door that enables passage of at least a portion of the air rush and blower noise to the vehicle exterior when the climate control system is operating in the recirculation mode.

SUMMARY OF THE INVENTION

The present invention provides a HVAC system for reducing air rush and blower noise escaping into the interior of the vehicle when the HVAC system is operated in the recirculation mode. The apparatus includes an acoustically transparent recirculation door that transmits a component of the air rush and blower noise to the vehicle exterior when the system is operating in the recirculation mode.

The acoustically transparent recirculation door includes forming a portion of the recirculation door from an acoustically transparent material. In particular, that portion of the recirculation door that operates to close the fresh air inlet includes an acoustically transparent material. When the recirculation door closes the fresh air inlet, air is drawn into the climate control system through the open recirculation air inlet. Providing the recirculation door with an acoustically transparent material enables noise generated during operation of the HVAC system to pass through that portion of the recirculation door positioned adjacent to the fresh air inlet and out the fresh air inlet to the exterior of the vehicle.

According to one aspect of the invention, the recirculation door may include a plurality of acoustically transparent apertures, the apertures positioned adjacent to the fresh air inlet when the recirculation door closes the fresh air inlet. The acoustically transparent apertures enabling at least a portion of the air rush and blower noise to pass through the recirculation door to the vehicle exterior.

DETAILED DESCRIPTION OF THE PREFERRED EMBODIMENTS

Figure 1:
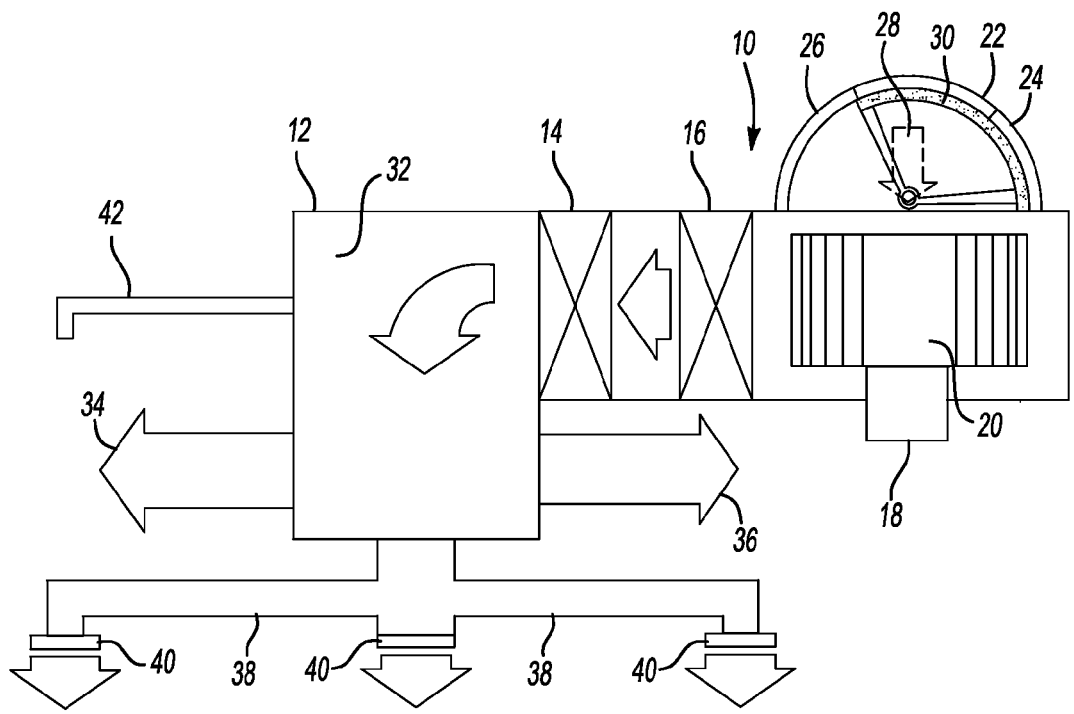
FIG. 1 is a schematic view of a climate control system utilizing a recirculation door according to the present invention.

Referring now to the drawings, FIG. 1 shows a climate control assembly, seen generally at 10, of a type typically used with an automotive vehicle. The climate control assembly 10 includes a housing or case 12 including a heater core 14, an evaporator core 16 and a blower motor 18 driving a blower wheel 20. A blower inlet 22, having a fresh air inlet 24 and a recirculation air inlet 26 is located near the blower wheel 20. The fresh air inlet 24 is typically located such that when the fresh air inlet 24 is open, the climate control assembly 10 draws air from outside the vehicle passenger compartment. The recirculation air inlet 26 is located within the vehicle passenger compartment and when the recirculation air inlet 26 is open, the climate control assembly 10 draws air from inside the vehicle passenger compartment. Accordingly, air, drawn in through either the fresh air inlet 24 or the recirculation air inlet 26, flows in the direction shown by the arrow 28. The blower inlet 22 includes a recirculation door 30 that operates to open and close the respective fresh air inlet 24 and recirculation air inlet 26.

In operation, air drawn in through either the fresh air inlet 24 or the recirculation air inlet 26, in the direction of the arrow 28, is forced by the blower wheel 20 through the evaporator core 16 and heater core 14 to a distribution plenum 32. From the distribution plenum 32 the air is directed either to the defrost nozzles 34 or heater outlet 36 when the heater core 14 is used to heat the airflow. When the evaporator core 16 operates to cool the airflow, the distribution plenum 32 directs the air through air-conditioning ducts 38 to air-conditioning outlets 40 located in the vehicle dashboard. When operating in the air-conditioning mode, a drain 42 operates to drain condensation and corresponding moisture from the assembly 10.

Figure 2:
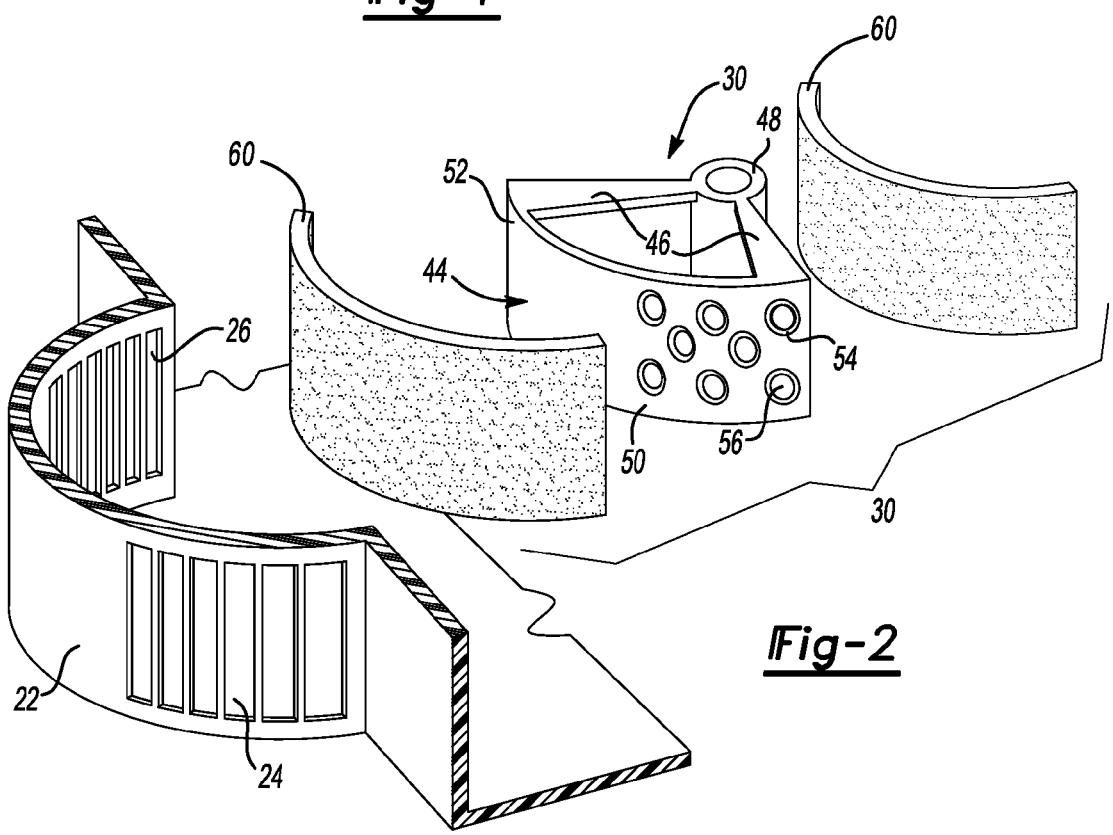
FIG. 2 is an enlarged, exploded view of a recirculation door according to the present invention.

Turning to FIG. 2, there is shown a recirculation door 30 in accordance with the present invention. The recirculation door 30 includes an arcuate door panel 44 configured to fit adjacent the arcuate shaped blower inlet 22. A pair of arm members 46 support the door panel 44 on a bushing 48. The bushing 48 is disposed over a rod or shaft (not shown) whereby the door panel 44 swings back and forth in between first and second positions. In the first position, the door panel 44 closes the recirculation air inlet 26 and opens the fresh air inlet 24. In the second position, the door panel 44 closes the fresh air inlet 24 and opens the recirculation air inlet 26. A suitable drive mechanism operates to move the recirculation door 30 between the first and second positions.

Figure 3:
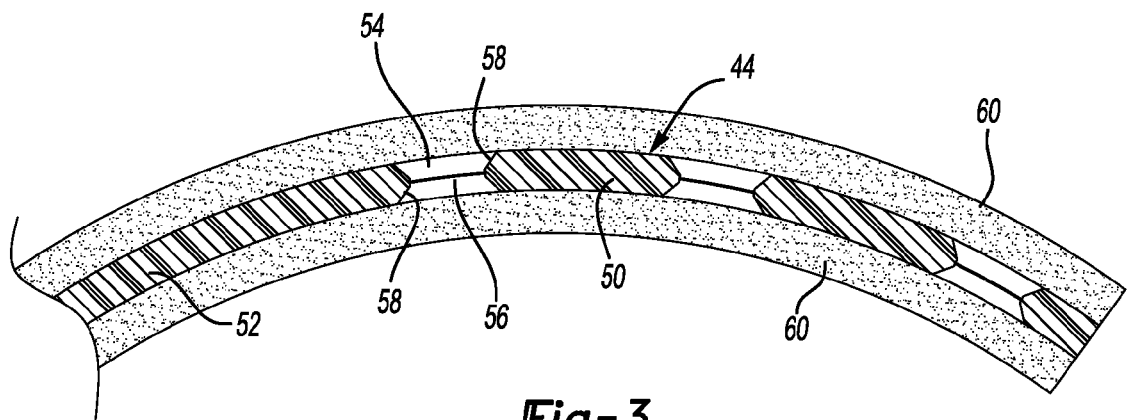
FIG. 3 is a cross-sectional view of a recirculation door according to the present invention.
Figure 4:
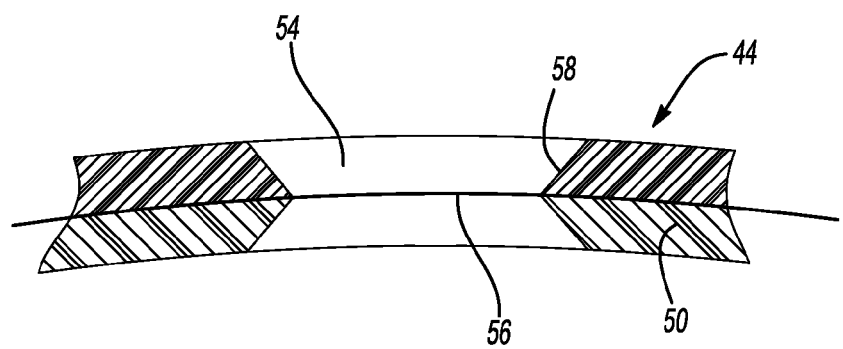
FIG. 4 is an enlarged cross-sectional view of a recirculation door according to the present invention illustrating an aperture therein having a acoustically transparent member positioned in the aperture according to one embodiment of the present invention.

As illustrated in FIGS. 2-4, the door panel 44 includes an acoustically transparent portion 50 and an acoustically opaque or non-transparent portion 52. As used herein, the term acoustically transparent means having a lower acoustical resistance than the acoustical opaque portion. For example, in the preferred embodiment, a portion of the door panel 44 is formed of an acoustically opaque material, such as polypropylene or nylon. Accordingly, the nontransparent or acoustically opaque portion 52 of the door panel 44 is formed of a rigid material that prevents the flow of air and sound waves through the door panel 44. When the acoustically opaque or nontransparent portion 52 of the door panel 44 is placed adjacent the recirculation air inlet 26, it closes the recirculation air inlet 26 to prevent airflow and noise transmission through the recirculation air inlet 26.

The acoustically transparent portion 50 of the door panel 44 includes a plurality of apertures 54. The apertures 54 allow the sound waves or noise to pass through the acoustically transparent portion 50 of the door panel 44. To prevent airflow through the acoustically transparent portion 50 of the door panel 44, an acoustically transparent member or layer 56 is placed in the apertures 54. As shown herein, the acoustically transparent member or layer 56 is a thermoplastic or polyester member placed in the apertures 54 located in the acoustically transparent portion 50 of the door panel 44. Mylar®, manufactured by DuPont Teijin Films of Hopewell, Va., is one type of thermoplastic or polyester member suitable for use as an acoustically transparent member or layer 56. It should be understood that the acoustically transparent member or layer 56 operates as an airflow barrier to prevent airflow through the apertures 54 while allowing noise or sound waves to pass through the apertures 54 located in the arcuate door panel 44. Thus, when the acoustically transparent portion 50 of the door panel 44 is placed adjacent the fresh air inlet 24, the acoustically transparent member or layer 56 allows air rush and blower noise, specifically the sound waves generated by operation of the blower and the air moving through the system, to pass through the apertures 54 rather than being reflected back into the vehicle interior through the recirculation inlet 26.

As illustrated in FIG. 3, the acoustically transparent member or layer 56 is secured within the apertures 54 located in the door panel 44. The apertures 54 includes sloped or beveled sidewalls 58 to redirect sound waves striking the surface of the door panel 44 through the acoustically transparent member 56. Maximizing, the number of apertures 54 located in the door panel 44 increases the overall surface area of the door panel 44 formed of the acoustically transparent member 56. Increasing the surface area formed of the acoustically transparent member 56 correspondingly increases amount of sound or noise that passes through the acoustically transparent portion 50 of the door panel 44.

Accordingly, since the strength, rigidity and ability to resist airflow forces of the acoustically transparent layer or member 56 varies, the ratio of the acoustically transparent member or layer 56 to the overall area of the acoustically transparent portion 50 of the door panel 44 will vary. Specifically, the acoustically transparent portion 50 of the door panel 44 includes the acoustically transparent member or layer 56 and a portion of the door panel 44 that provides support for the acoustically transparent member or layer 56. The invention contemplates that the acoustically transparent portion 50 of door panel 44 utilized the greatest amount or surface area of acoustically transparent member or layer 56. As set forth above, one approach is a plurality of apertures 54 located in the acoustically transparent portion 50 of the door panel 44. Another approach may include a honeycomb type construction formed of a plurality of thinwall cells, each cell supporting an acoustically transparent member or layer 56 secured and supported within each cell.

In addition, the door panel 44 may include a seal member 60 placed on one or both sides of the door panel 44. Generally, the seal member 60 is made of a compressible material, such as foam. Suitable foams for use with recirculation doors are known and include for example polyester and polyurethane foams. Such foams also function to reduce any noise reflected back into the housing or case 12 of the climate control assembly 10.

As illustrated in FIG. 4, the acoustically transparent member or layer 56 is molded within the door panel 44. The sidewalls 58 of the apertures 54 are configured to funnel sound waves through the acoustically transparent member 56. In this embodiment, the acoustically transparent member or layer 56 is a thin film molded into the door panel 44 during the manufacturing process. Once again, the acoustically transparent portion 50 of the door panel 44 supports the acoustically transparent member or layer 56. Accordingly, the acoustically transparent portion 50 of the door panel 44 located adjacent the fresh air inlet 24, when the recirculation door 30 is placed in the recirculation mode, supports the acoustically transparent member or layer 56 adjacent the fresh air inlet 24 thereby allowing passage of noise or sound waves while preventing airflow.

Figure 5:
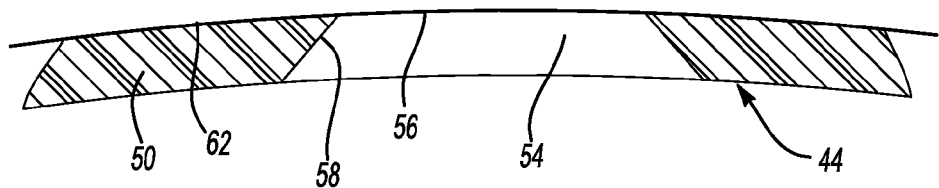
FIG. 5 is an enlarged cross-sectional view of a recirculation door according to the present invention illustrating an aperture therein having a acoustically transparent member positioned in the aperture according to an additional embodiment of the present invention.

FIG. 5 illustrates an alternative embodiment of the recirculation door 30 wherein the acoustically transparent member or layer 56 is secured, typically through an adhesive, on one side 62 of the door panel 44 such that the acoustically transparent member or layer 56 covers the apertures 54. As with the previous embodiment, a compressible seal member 60, such as a polyester or polyurethane foam, may be placed over the door panel 44 and correspondingly next to the acoustically transparent member or layer 56. The compressible seal member 60 also provides support for the acoustically transparent member or layer 56 and helps reduce noise transmission within the climate control assembly 10.

Figure 6:
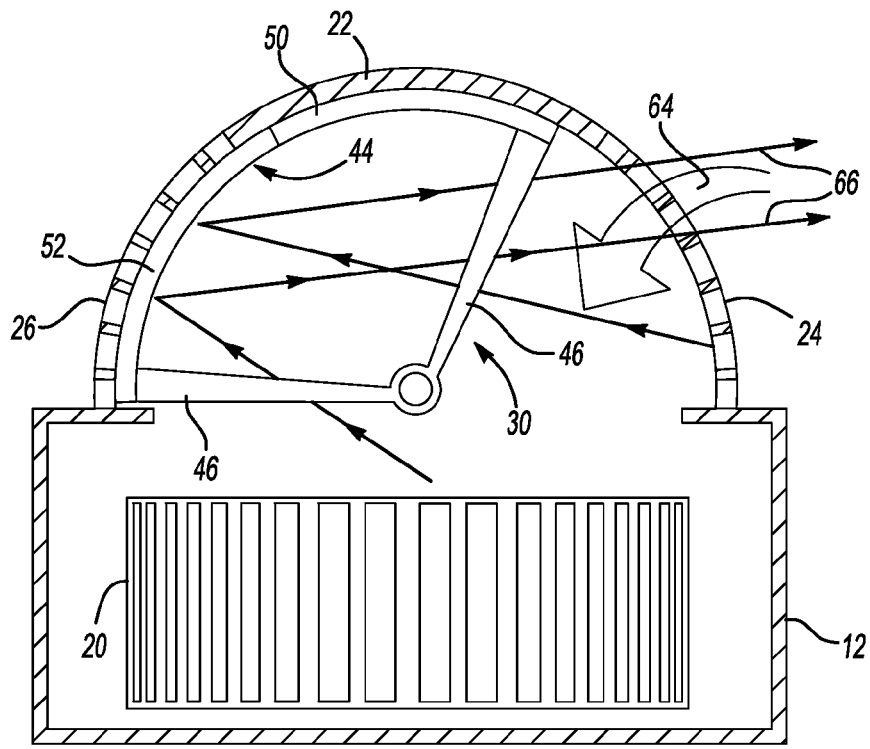
FIG. 6 illustrates a recirculation door according to the present invention placed such that the recirculation air inlet is closed and the fresh air inlet is open.

FIG. 6 illustrates the climate control assembly 10 operating in the fresh air mode, where air is drawn in, as illustrated by the arrow 64, through the fresh air inlet 24 for distribution through the housing or case 12 and ultimately through the defroster, 34 heater outlet, 36 or A/C outlets 40. In the fresh air mode, the recirculation door 30 is located at a fresh air position wherein the acoustically opaque or nontransparent portion 52 of the door panel 44 covers the recirculation air inlets 26. Accordingly, as illustrated in FIG. 6, resultant air rush noise along with noise generated from the blower and blower motor noise, illustrated by noise vectors 66, generated in the housing or case 12 strikes the acoustically opaque portion 52 of the door panel 44 and is reflected outward through the fresh air inlet 24.

Figure 7:
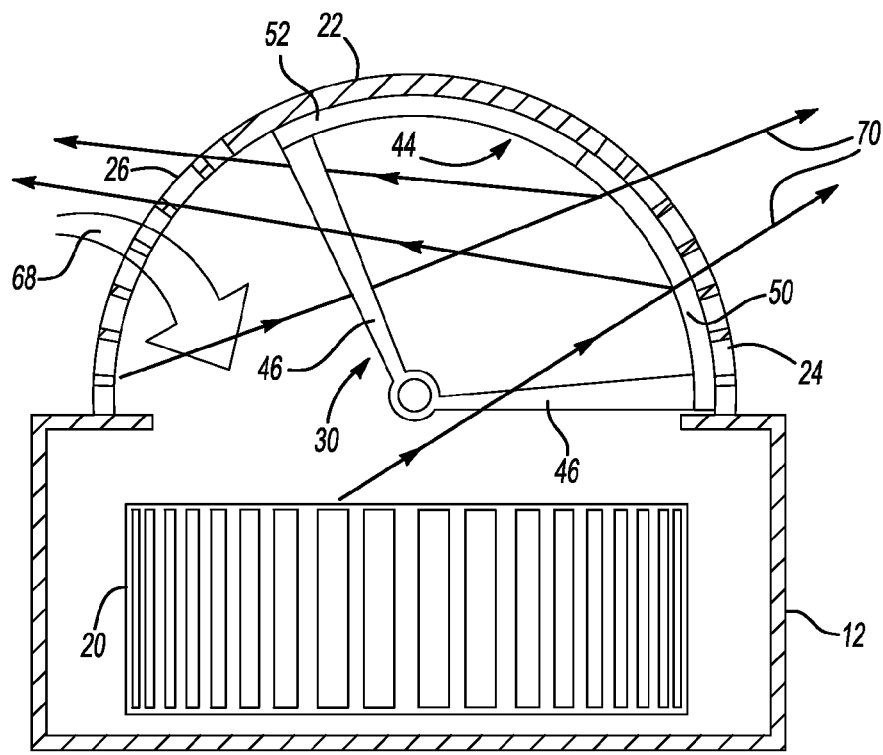
FIG. 7 illustrates a recirculation door according to the present invention placed such that the recirculation air inlet is open and the fresh air inlet is closed.

Conversely, as illustrated in FIG. 7, placing the recirculation door 30 in the recirculation mode results in air, as illustrated by the arrow 68, being drawn in through the recirculation air inlets 26. When positioned in the recirculation mode, the acoustically transparent portion 50 of the door panel 44 is placed adjacent to and closes the fresh air inlet 24. Accordingly, air rush noise along with blower and blower motor noise, illustrated by noise vectors 70, generated in the housing or case 12 strikes the acoustically transparent portion 50 of the door panel 44 wherein at least a portion of the noise travels through the acoustically transparent portion 50 of the door panel 44 and out the fresh air inlet 24. Accordingly, the acoustically transparent portion 50 of the door panel 44 reduces the noise being reflected back into the vehicle operating compartment through the recirculation air inlet 26.

FIGS. 3-6 illustrate one type of acoustically transparent recirculation door 30. Accordingly, the recirculation door 30 of the present invention includes an acoustically transparent portion 50 and an acoustically opaque portion 52. Both portions 50, 52 functioning to reduce the noise level of the climate control assembly 10 by channeling or directing noise generated by the system outwards towards the fresh air inlet 24 and vehicle exterior rather than towards the recirculation air inlet 26 and ultimately the vehicle interior.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A HVAC system for use in an automotive vehicle comprising:
    a housing including a fresh air inlet and a recirculation air inlet;
    a blower, said blower located in said housing and controlling air flow through said housing;
    a recirculation door, said recirculation door operative to selectively open and close said fresh air inlet and said recirculation air inlet, said recirculation door including two separate portions, an acoustically transparent portion and an acoustically opaque portion, said acoustically transparent portion operative to close said fresh air inlet and said acoustically opaque portion operative to close said recirculation air inlet, wherein said acoustically opaque portion of said recirculation door closes said recirculation air inlet independent of said acoustically transparent portion.

2. A HVAC system for use in an automotive vehicle as set forth in claim 1 wherein said acoustically transparent portion of said recirculation door that closes said fresh air inlet includes an acoustically transparent member.

3. A HVAC system for use in an automotive vehicle as set forth in claim 2 wherein said acoustically transparent member includes a thermoplastic material.

4. A HVAC system for use in an automotive vehicle as set forth in claim 3 wherein said thermoplastic material is a polyester film.

5. A HVAC system for use in an automotive vehicle as set forth in claim 1 including said acoustically transparent portion of said recirculation door having a plurality of apertures therein; and
    a plurality of acoustically transparent members, said members located in said apertures and preventing air flow through said apertures.

6. A HVAC system for use in an automotive vehicle as set forth in claim 1 wherein said acoustically transparent portion of said recirculation door includes a perforated portion, and
    an acoustically transparent member located on said recirculation door and preventing air flow through said perforated portion.

7. A HVAC system for use in an automotive vehicle as set forth in claim 2 wherein said acoustically transparent member includes a thermoplastic material.

8. A HVAC system for use in an automotive vehicle as set forth in claim 2 wherein said acoustically transparent member includes a polyester film.

9. A HVAC system for use in an automotive vehicle as set forth in claim 1 including a seal member attached to said recirculation door.

10. A HVAC system for use in an automotive vehicle as set forth in claim 1 wherein acoustically transparent portion of said recirculation door includes a multilayer door panel, said door panel including a perforated layer and an acoustically transparent layer.

11. A HVAC system for use in an automotive vehicle as set forth in claim 1 wherein said acoustically transparent layer includes a polyester film layer adhered to and supported by said perforated layer.

12. A HVAC system for use in an automotive vehicle as set forth in claim 10 wherein said acoustically transparent layer includes a thermoplastic component.

13. A HVAC system for use in an automotive vehicle as set forth in claim 10 including a seal member.

14. A HVAC system for use in an automotive vehicle as set forth in claim 1 including a seal member, said seal member including a foam layer attached to said recirculation door.

15. A recirculation door for use with a HVAC system for use in an automotive vehicle comprising:
    a housing;
    a fresh air inlet and a recirculation air inlet;
    a blower,
    a door panel moveable between first and second positions, in said first position a first portion of said door panel closing said recirculation inlet and in said second position a second portion of said door panel closing said fresh air inlet, said first portion of said door being entirely acoustically opaque and said second portion including an acoustically transparent material whereby when said door panel is placed in said first position, said acoustically opaque material limits acoustic energy from entering said recirculation inlet and when said door panel is placed in said second position, said acoustically transparent material enables sound waves to pass through said door panel and into said fresh air inlet.

16. A recirculation door as set forth in claim 15 including said second portion having a plurality of apertures; and
    a plurality of acoustically transparent thermoplastic members located in said apertures.

17. A recirculation door as set forth in claim 16 wherein said acoustically transparent thermoplastic members include a polyester film positioned to prevent air flow through said apertures.

18. A recirculation door as set forth in claim 15 wherein said second portion includes a multilayer panel, said panel including a perforated layer and an acoustically transparent layer.

19. A recirculation door as set forth in claim 18 wherein said acoustically transparent layer includes a polyester film.

20. A recirculation door for use with a HVAC system used in an automotive vehicle comprising:
- a housing;
- a fresh air inlet and a recirculation air inlet;
- a blower,
- a panel member having first and second portions, said first portion used to close said recirculation air inlet of said HVAC system and said second portion used to close said fresh air inlet of said HVAC system, said second portion having a plurality of apertures;
- a polyester film layer located in said apertures, said polyester film layer preventing air flow through said apertures; and
- said first portion of said panel member being acoustically opaque and forming, separate from said second portion a barrier to acoustic energy when said first portion closes said recirculation air inlet.

* * * * *

UNITED STATES PATENT AND TRADEMARK OFFICE
CERTIFICATE OF CORRECTION

PATENT NO.        : 7,520,804 B2                                           Page 1 of 1
APPLICATION NO. : 11/290665
DATED             : April 21, 2009
INVENTOR(S)       : Suhas Venkatappa and Prakash Thawani It is certified that error appears in the above-identified patent and that said Letters Patent is hereby corrected as shown below:

In Column 6, Line 25, kindly delete "1" and insert --10--.

Signed and Sealed this

Twenty-third Day of June, 2009

JOHN DOLL
*Acting Director of the United States Patent and Trademark Office*